US008169996B2

(12) United States Patent
Bishop

(10) Patent No.: US 8,169,996 B2
(45) Date of Patent: May 1, 2012

(54) SYNCHRONIZED BEACON FOR NETWORK HAVING MULTIPLE RADIOS

(75) Inventor: Donald M. Bishop, Highlands Ranch, CO (US)

(73) Assignee: Sandwave IP, LLC, Loveland, CO (US)

( * ) Notice: Subject to any disclaimer, the term of this patent is extended or adjusted under 35 U.S.C. 154(b) by 919 days.

(21) Appl. No.: 11/392,379

(22) Filed: Mar. 28, 2006

(65) Prior Publication Data

US 2006/0217138 A1 Sep. 28, 2006

Related U.S. Application Data

(60) Provisional application No. 60/594,315, filed on Mar. 28, 2005.

(51) Int. Cl.
*H04J 3/06* (2006.01)

(52) U.S. Cl. ........................................ 370/350; 455/502

(58) Field of Classification Search .................. 370/328, 370/334; 455/502
See application file for complete search history.

(56) References Cited

U.S. PATENT DOCUMENTS

| | | | |
|---|---|---|---|
| 5,940,765 A * | 8/1999 | Haartsen | 455/462 |
| 6,028,853 A | 2/2000 | Haartsen | |
| 6,917,804 B2 | 7/2005 | Takayama et al. | |
| 6,961,555 B1 | 11/2005 | Philyaw | |
| 6,980,819 B2 | 12/2005 | Sugaya et al. | |
| 2003/0145092 A1* | 7/2003 | Funato et al. | 709/229 |
| 2003/0202497 A1* | 10/2003 | Csapo | 370/338 |
| 2004/0131034 A1 | 7/2004 | Sugaya | |
| 2004/0192415 A1* | 9/2004 | Luglio et al. | 455/575.1 |
| 2005/0063348 A1 | 3/2005 | Donovan | |
| 2005/0064818 A1 | 3/2005 | Assarsson et al. | |
| 2005/0068934 A1 | 3/2005 | Sakoda | |
| 2005/0075118 A1* | 4/2005 | Lewis et al. | 455/456.5 |
| 2005/0124294 A1 | 6/2005 | Wentink | |
| 2005/0124344 A1* | 6/2005 | Laroia et al. | 455/436 |
| 2005/0255844 A1* | 11/2005 | Sugaya et al. | 455/426.1 |
| 2005/0286486 A1* | 12/2005 | Miller | 370/351 |

* cited by examiner

*Primary Examiner* — Marcos Batista

(74) *Attorney, Agent, or Firm* — Russell S. Krajec; Krajec Patent Offices, LLC

(57) ABSTRACT

A network having multiple radios transmits a beacon signal from several radios substantially simultaneously. One embodiment includes a network having a communications backbone that connects several radio transceivers. Another embodiment includes a single station having multiple radio transceivers, which may or may not have directional antennas. Various methods for synchronizing the beacon signals may be used, including transmitting a heartbeat signal along the network so that the beacon signals are broadcast substantially simultaneously.

28 Claims, 4 Drawing Sheets

SYNCHRONIZED BEACON FOR NETWORK HAVING MULTIPLE RADIOS

CROSS REFERENCE TO RELATED APPLICATIONS

The present application claims priority to and the benefit of U.S. Provisional Patent Application Ser. No. 60/594,315 entitled "Synchronized Beacon for Network Having Multiple Radios" filed on 28 Mar. 2005 by Donald M. Bishop, the entire contents of which are hereby expressly incorporated by reference. The present application is related to co-pending and simultaneously filed U.S. Non-Provisional patent application Ser. No. 11/392,366 entitled "Synchronized Beacon for Wireless Access Point Having Multiple Radios", the entire contents of which are hereby expressly incorporated by reference.

BACKGROUND OF THE INVENTION a. Field of the Invention

The present invention pertains generally to communication networks and specifically to networks having multiple radios.

b. Description of the Background

Wireless communications networks are being widely deployed. In order to ensure subscriber coverage, a wireless network may have several radio transceivers positioned so that the coverage areas of the radios overlap. As radio coverage areas overlap, some interference and undesirable cross-communication between radios may occur. Such interference may decrease available bandwidth, which diminishes the number and quality of potential subscriber connections.

Many wireless protocols have a feature whereby a device can sense if another device is using the specific frequency or band, and the first device will refrain from transmitting. In some protocols, the first device may retry the transmission at a later time, which may be a randomly generated time. Such a feature aims to minimize one device 'talking over' another device and preventing both device's transmissions from getting through. This collision detection feature is widely used in many different protocols, including standard wired Ethernet and wireless Ethernet-based protocols such as IEEE 802.11 wireless protocols.

A distinct problem with such protocols is that the bandwidth is inherently underutilized and throughput for each device can be much less than optimal, especially when many devices are communicating on the network. When many devices attempt to communicate on the band simultaneously, the collision detection and avoidance procedures begin to occupy much of the communication bandwidth.

It would therefore be advantageous to provide a system and method for providing improved use of the available bandwidth for communication networks having several radios.

SUMMARY OF THE INVENTION

The present invention provides a system and method for communicating on a network having multiple radios by substantially simultaneously transmitting a beacon signal from the radios. One embodiment includes a network having a communications backbone that connects several radio transceivers. Another embodiment includes a single station having multiple radio transceivers, which may or may not have directional antennas. Various methods for synchronizing the beacon signals may be used, including transmitting a heartbeat signal along the network so that the beacon signals are broadcast substantially simultaneously.

One embodiment of the present invention may include a network comprising: a backbone; a plurality of radio terminals connected to the backbone, each of the plurality of radios being adapted to establish at least one two-way data communication session, and adapted to delay sending a transmission when another ongoing transmission is detected; wherein each of the plurality of radios being adapted to transmit a beacon signal substantially simultaneously.

Another embodiment of the present invention may include a wireless access point comprising: connection to a network; a plurality of directional antennas; a plurality of radio transceivers, each of the plurality of radio transceivers being adapted to establish at least one two-way data communication session, and adapted to delay sending a transmission when another ongoing transmission is detected; wherein each of the plurality of radio transceivers being adapted to transmit a beacon signal substantially simultaneously.

Yet another embodiment of the present invention may include a method comprising: establishing communications between a controller and a plurality of wireless access points connected on a network; determining a transmission delay for each of the plurality of wireless access points connected on the network; determining a maximum transmission delay from the transmission delays; calculating a beacon delay for each of the plurality of wireless access points using the maximum transmission delay and the transmission delays; sending a synchronization signal from the controller to the plurality of wireless access points via the network; and transmitting a beacon signal from each of the plurality of wireless access points substantially simultaneously using the heartbeat and the beacon delay for each of the plurality of wireless access points.

DETAILED DESCRIPTION OF THE INVENTION

Figure 1:
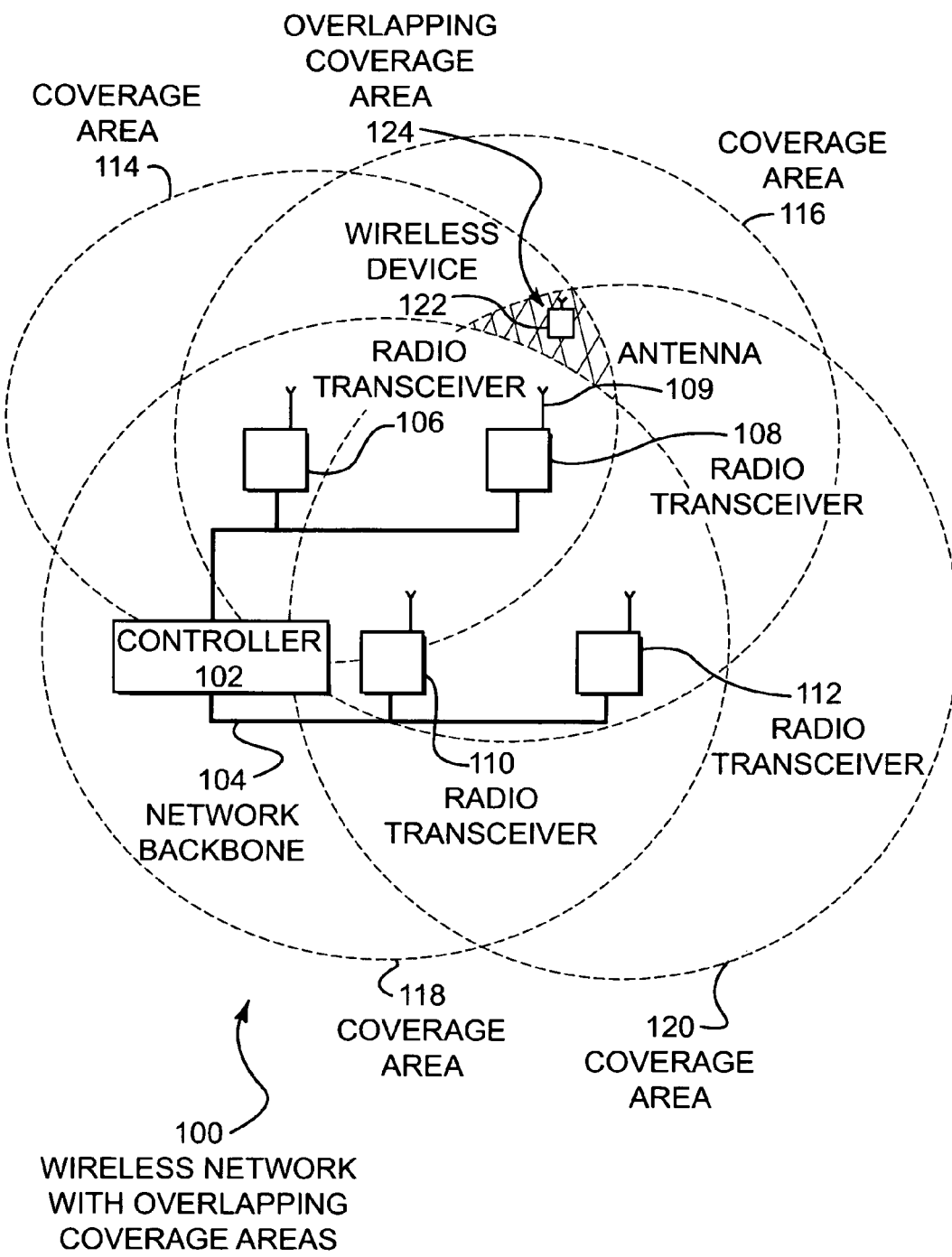
FIG. 1 is a diagrammatic illustration of an embodiment showing a wireless network with overlapping coverage areas.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify the elements throughout the description of the figures. It will also be understood that when an element is referred to as being "connected" or "coupled" to another element, it can be directly connected or coupled to the other element or one or a multitude of intervening elements may also be present. In contrast, when an element is referred to as being "directly connected" or "directly coupled" to another element, there are no intervening elements present.

The present invention may be embodied as devices, systems, methods, and/or computer program products. Accordingly, the present invention may be embodied in hardware and/or in software (including firmware, resident software, micro-code, etc.) Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), an erasable programmable read-only memory (EPROM or Flash memory), an optical fiber, a portable compact disc read only memory (CD-ROM), and a digital versatile disk read only memory (DVD-ROM). Note that the computer-usable or computer-readable medium could even be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

FIG. 1 illustrates an embodiment 100 showing a wireless network with overlapping coverage areas. A network controller 102 is connected to a network backbone 104. Connected to the backbone 104 are radio transceivers 106, 108, 110, and 112. Each radio transceiver has an antenna, such as antenna 109 connected to transceiver 108. Transceiver 106 has a coverage area 114. Similarly, transceivers 108, 110, and 112 have coverage areas 116, 118, and 120, respectively. A wireless device 122 is located in an overlapping coverage area 124. In the area 124, radio transmissions from transceivers 106, 108, and 112 all overlap.

In embodiment 100, two or more of the transceivers 106, 108, 110, and 112 may simultaneously transmit a beacon signal. By simultaneously transmitting a beacon signal, bandwidth is freed up that would otherwise be dedicated to transmitting and receiving beacon signals from transceivers with overlapping coverage areas.

Radio transceivers 106, 108, 110, and 112 may periodically transmit a beacon signal. Such a signal may identify the transceiver and provide information such that other devices in the area may begin communications. In many embodiments, the beacon signal may provide a unique identifier for the radio, as well as an identifier for the network and transmission parameters so that another device may successfully initiate communications.

In many cases, radios that communicate with digitized or other forms of data communication, in a similar way as human operated audio radio communication, are able to listen on the communication band, determine that the band is quiet, then begin a transmission. If another device is transmitting, the radio is able to wait until the band is quiet before attempting another transmission. This technique prevents two radios from simultaneously transmitting and distorting each other's signals.

Many standards have been developed for automated data transmission over wireless airwaves. Examples are cellular phone networks, wireless data standards such as IEEE 802.11, various spread spectrum and time division multiple access standards, and many others.

As more devices are attempting to communicate in a certain geographical area, the available bandwidth decreases. Especially after a certain number of devices is reached, the available bandwidth and data throughput decreases exponentially as more devices are added.

One reason for the decrease in bandwidth is the communications overhead associated with each device. For example, fixed base stations may transmit a beacon signal on a periodic basis. In a typical prior art application, when one radio transmits a beacon signal, another radio within the area would be thereby forced to wait to transmit its beacon signal or any other signal. In an area where many radio coverage areas overlap, a significant portion of the bandwidth might become cluttered with the repeated transmission of beacon signals of the transceivers from overlapping coverage areas. This is because as each radio transmits its own beacon signal, all other devices typically refrain from transmitting.

In the embodiment 100, two or more of the transceivers may simultaneously transmit beacon signals. The coordinated transmission of beacon signals may eliminate much of the transmission overhead on a channel or frequency that is shared by all the transceivers. The coordination and synchronization of the beacon signals may be accomplished using many methods. In one method, a centralized controller 102 may transmit various signals along a network backbone 104 to cause the various transceivers to synchronize.

In some embodiments, every transceiver having overlapping coverage area with another transceiver may transmit synchronized beacon signals, whereas in other embodiments two or more transceivers may do so. In particularly busy areas, synchronized beacon signals are especially useful, since the bandwidth can be at a premium in congested areas.

Some radio transmission schemes have a base and remote architecture. In such a scheme, the base stations have a defined transmission scheme that may include a repeated beacon signal. The remote devices in such a scheme may or may not transmit a beacon signal and may or may not be able to communicate directly from one remote device to another. Examples of such schemes include IEEE 802.11 and the various cellular phone architectures. In many cases, the base stations are connection points for other networks such as the Internet or POTS phone system.

In contrast, other schemes have a peer to peer architecture. In such a scheme, each device operates in the same manner as all the other devices in the area and any device is able to transmit to any other device in the area.

One purpose of a beacon signal is to alert other devices in the area of a station's presence. In situations where a remote device is in the area of a base station, the remote device may be capable of listening for a base station's beacon signal, interpreting the signal, and establishing connections.

For example, the device 122 is located within the transmission coverage areas of radio transceivers 106, 108, and 112. The area 124 is highlighted showing the overlapping coverage areas. If the beacon signals of the transceivers 106, 108, and 112 were asynchronously transmitting beacon signals, each transceiver 106, 108, and 112 would wait until the other transceivers had completed their beacon signals before transmitting a beacon signal of its own. This process would take up at least three times the bandwidth of a single beacon signal. In some instances, since some devices may delay more than others after detecting that another device was transmitting, the bandwidth used up by the beacon signals may be four or more times the bandwidth consumed by a single beacon signal.

When the transceivers 106, 108, and 112 simultaneously transmit a beacon signal, the device 122 may be able to detect and decode at least one of the beacon signals. In practice, it is likely that the device 122 may detect and decode the beacon signal from the nearest transceiver. In this example, the device 122 may be able to detect and decode the beacon signal from transceiver 108 because the signal to noise ratio for the beacon signal from transceiver 108 may be greater than either of the simultaneous beacon signals from transceivers 106 and 112. In some situations, the device 122 may detect the beacon signals from one of the transceivers 106 or 112, depending on the relative signal strength of the particular beacon signal.

Overlapping coverage areas are typical of many wireless networks where a full coverage is desired over a specific area. For example, a wireless data network may provide coverage in a large building, shopping mall, or airport using multiple radio transceivers with overlapping coverage areas. Similarly, a school campus or residential neighborhood may be blanketed by various wireless networks for data, voice, or other communications.

Beacon signals from one or more radio transceivers may be synchronized by sending a synchronizing signal over the network 104 that connects the transceivers. In many cases, a controller 102 may provide a repeated synchronizing signal known as a heartbeat. In some cases, the heartbeat may be transmitted for every occurrence of a beacon signal. In other cases, the heartbeat may be transmitted once to coordinate a clock on each of the radio transmitters. In such cases, the synchronized clocks in the radio transmitters may continue to repeatedly transmitting beacon signals based on an internal oscillator in the radio.

For the purposes of this specification, the terms "radio," "radio transceiver," "wireless access point," "transceiver," and similar terms are used interchangeably. Similarly, the terms "backbone," "network," "network backbone," etc. are also used interchangeably.

Many network architectures comprise a network backbone with several wireless transceivers attached to the backbone. For example, a wireless service provider may connect several wireless access points using digital subscriber line (DSL) connections to a central access point. In another example, a cable television and internet connection service may be provided through a hybrid fiber/coax (HFC) network with wireless subscriber connections mounted on utility poles or utility pedestals in a neighborhood.

The network backbone 104 may be any type of hardwired or wireless connection between the various transceivers. In some configurations, the backbone 104 may be fiber optic cable, coaxial cable, twisted pair, or some other directly connected communication path. In other configurations, microwave communications or other radio frequency may be used to connect various portions of the network. In still other configurations, any combination of connection may be used.

The controller 102 may be any type of device in communication with one or more of the transceivers. In some configurations, the controller 102 may be a centralized computer, hub, switch, gateway, headend, Cable Modem Termination System (CMTS), Digital Subscriber Line Access Multiplexer (DSLAM), or any other device that communicates along the backbone 104. In some configurations, the controller 102 may provide connection between the backbone 104 and the Internet, telephone network, or another outside network.

In some configurations, the controller 102 may be a dedicated device that provides a synchronization function for the transceivers. In still other configurations, one of the transceivers may have a controller function enabled and function as both a transceiver as well as the controller 102.

The controller 102 may provide various sorts of communications in order to synchronize the beacon signals of the various transceivers attached to the backbone 104. For example, the controller 102 may send out a 'heartbeat' or synchronization pulse that can be used by the transceivers to synchronize the beacon signals. In another configuration, the controller 102 may transmit a single transmission that is used to synchronize an oscillator on each transceiver. Thereafter, the oscillator within each transceiver will indicate when a beacon signal is to be sent. In some cases, the synchronization signal may be sent from the controller 102 periodically to resynchronize the oscillators in the transceivers.

Figure 2:
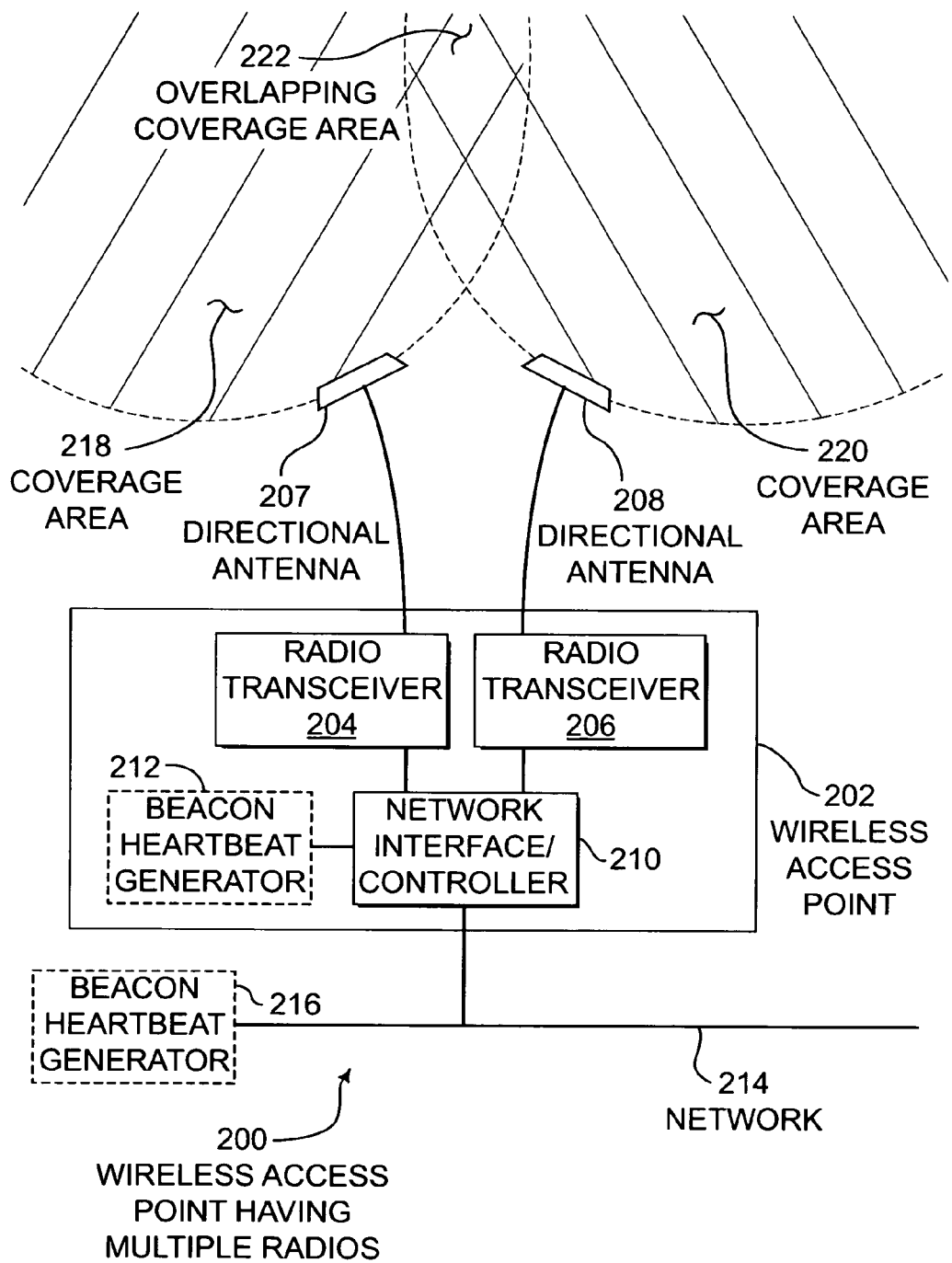
FIG. 2 is a diagrammatic illustration of an embodiment showing a wireless access point having multiple radios.

FIG. 2 illustrates an embodiment 200 of a wireless access point having two radio transceivers. The wireless access point 202 contains radio transceivers 204 and 206. Directional antennas 207 and 208 are connected to transceivers 204 and 206, respectively. A network interface/controller 210 connects the transceivers to the network 214. An optional beacon heartbeat generator 212 is located inside the wireless access point 202. Another optional beacon heartbeat generator 216 may be connected to the network 214. The directional antenna 207 has a coverage area 218. Similarly, the directional antenna 208 has a coverage area 220. The overlapping coverage area 222 is the area where both antenna signals overlap.

The wireless access point 202 may be a single device that is fixedly mounted in an area for wireless communications. For example, the wireless access point 202 may be mounted in an airport terminal, a coffee shop, a residential neighborhood, an office building, or any other area where it is desired to service the area with two or more radio transceivers. In many cases, a single radio transceiver may be overwhelmed by the communications, so it may be desirable to service the area by using multiple radios with directional antennas to cover specific sectors. In some cases, the sectors may overlap, while in other cases the sectors may not overlap.

In some configurations, the proximity of the antennas 207 and 208 may cause some interference between the two radio systems. In such cases, it is possible that the beacon signal from one antenna may be received by the other antenna, causing the receiving transceiver to become quiet while the other transceiver is transmitting.

The beacon signals of the two radio transceivers 204 and 206 may be synchronized by a beacon heartbeat generator 212 that is part of the wireless access point 202. The beacon heartbeat generator 212 may be an oscillator that generates a pulse at a predetermined interval. The pulse may be communicated to the radio transceivers 204 and 206 and indicate that a beacon signal is to be transmitted. In some configurations, the heartbeat generator 212 may send a signal for each beacon signal, while in other configurations, the heartbeat generator 212 may send a single signal, or may send a signal at other intervals. The network beacon heartbeat generator 216 may function in the same manner as the built-in beacon heartbeat generator 212, but may be located remotely.

In many configurations, the radio transceivers 204 and 206 may be independent devices having separate processors and capable of operating independently from each other. Such a configuration may allow each transceiver 204 or 206 to conduct separate communications with devices within its coverage area. Each transceiver 204 and 206 may have a dedicated input line or be otherwise adapted to receive a beacon transmission signal from the controller 210 or beacon heartbeat generators 212 or 216.

The network interface/controller 210 may perform several functions, including transmitting communications between the network 214 and the radio transceivers 204 and 206. In some configurations, the network interface/controller 210 may have a processor or state machine that is independent from the radio transceivers 204 and 206.

The embodiment 200 illustrates an example of a multiple radio transceiver system where the radio transceivers are located in very close proximity. Some configurations may have three or more radio transceivers. In some configurations, the system may have the wireless access point 202 located in one location, with the directional antennas 207 and 208 located remotely. For example, a wireless access point 202 may be located on one floor of a multistory building while the various directional antennas may be each located on a different floor of the building. The directional antennas in such an example may have a horizontal coverage area that covers one floor of the building.

The embodiment 200 functions in a similar manner as the embodiment 100, with multiple radios having a synchronized beacon signal. In the case of embodiment 200, the 'backbone' may be a communication path through the controller 210.

In a specific configuration of embodiment 200, a wireless access point 202 may be mounted in a single box with the directional antennas 207 and 208 mounted on the outside surface of the box. Such a configuration may be mounted on an interior wall of a building, whereas a weather tight configuration may be mounted on a utility pole, utility pedestal, or on an exterior wall of a building.

Figure 3:
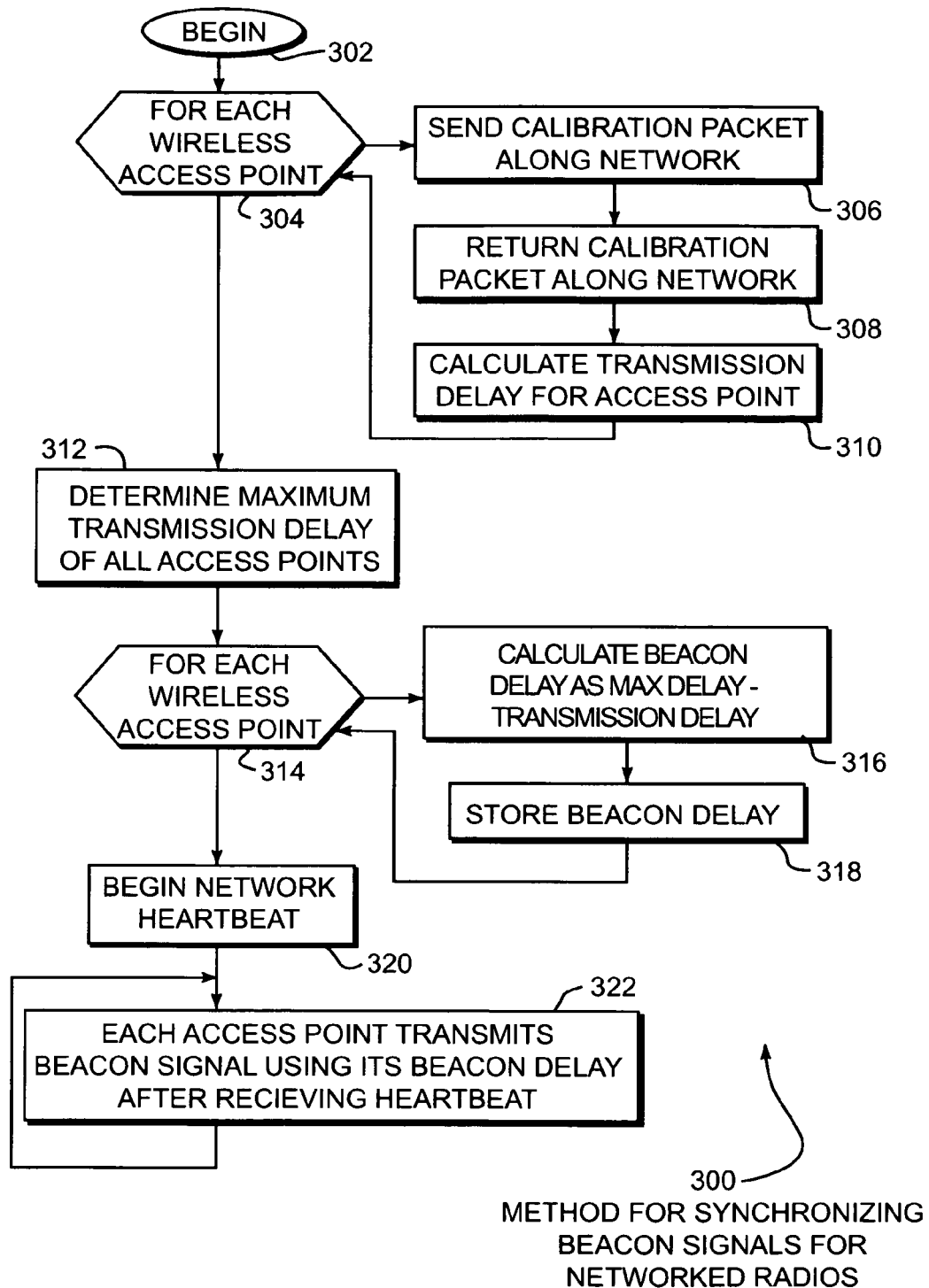
FIG. 3 is a flowchart illustration of an embodiment showing a method for synchronizing beacon signals for networked radios.

FIG. 3 illustrates an embodiment 300 of a method for synchronizing beacon signals for networked radios. The process begins in block 302. For each wireless access point in block 304, a calibration packet or message is sent along the network in block 306 and returned in block 308. The transmission delay for the wireless access point is calculated in block 310. The maximum transmission delay is determined in block 312. For each wireless access point in block 314, a beacon delay is calculated in block 316 by subtracting the transmission delay for that wireless access point from the maximum delay determined in block 312. The beacon delay is stored in block 318. The network heartbeat is begun in block 320. Each wireless access point transmits a beacon signal using its particular beacon delay after receiving the heartbeat in block 322. Block 322 is repeated.

Embodiment 300 is one method by which a group of networked radios may be synchronized. Such a method is applicable to a configuration such as embodiment 100 where various radios are dispersed along a communication backbone. The method 300 takes into account the propagation delay of the communications backbone so that the beacon signals of all the radios are transmitted substantially simultaneously. In some configurations, each wireless access point may contain one radio transceiver, while in other configurations, one or more wireless access points may contain multiple radios as illustrated in embodiment 200.

In very few cases will the beacon signals of the synchronized radios be broadcast exactly at the same instant. However, the beacon signals may be broadcast substantially simultaneously such that most of the radios are broadcasting a beacon signal substantially at the same time. In many cases, the start and end of the beacon signals may not be exactly simultaneous, but in general the beacon signals may overlap in time.

In the embodiment 300, a transmission delay is calculated for each wireless access point in blocks 306, 308, and 310. The transmission delay may be the transmission time from the heartbeat generator to the particular wireless access point. Many transmission networks have mechanisms for determining a transmission delay. For example, many cable television plants have methods for determining transmission delay. Any method for transmission delay calculation may be used while keeping within the spirit and intent of the present invention.

After the transmission delay is determined for each wireless access point, a beacon delay is calculated for each wireless access point by subtracting the transmission delay from the maximum transmission delay of all the wireless access points. When a heartbeat signal is received, each wireless access point may delay the beacon signal by its beacon delay so that all of the radios may broadcast a beacon signal at substantially the same time.

In some configurations, the beacon delay calculated in block 316 may be stored in a memory location of the wireless access point in block 318. In other configurations, the beacon delay may be stored in a centralized controller. In such a configuration, the controller may transmit separate signals to each of the radios to synchronously broadcast the beacon signal. The controller may use the beacon delay of each wireless access point to determine the exact time that a beacon transmit signal is to be sent to a particular wireless access point.

When the beacon delay is stored in the wireless access point, the controller may transmit a single communication to all of the radios. When the signal is received by the wireless access point, the wireless access point may delay the broadcast of the beacon signal by the beacon signal delay. In this manner, all of the radio transceivers may broadcast the beacon signal substantially simultaneously.

In some configurations, the heartbeat may be transmitted at each beacon signal, whereas in other configurations, the heartbeat may be transmitted once and oscillators within each radio may be used to determine when a beacon signal is to be rebroadcast.

Figure 4:
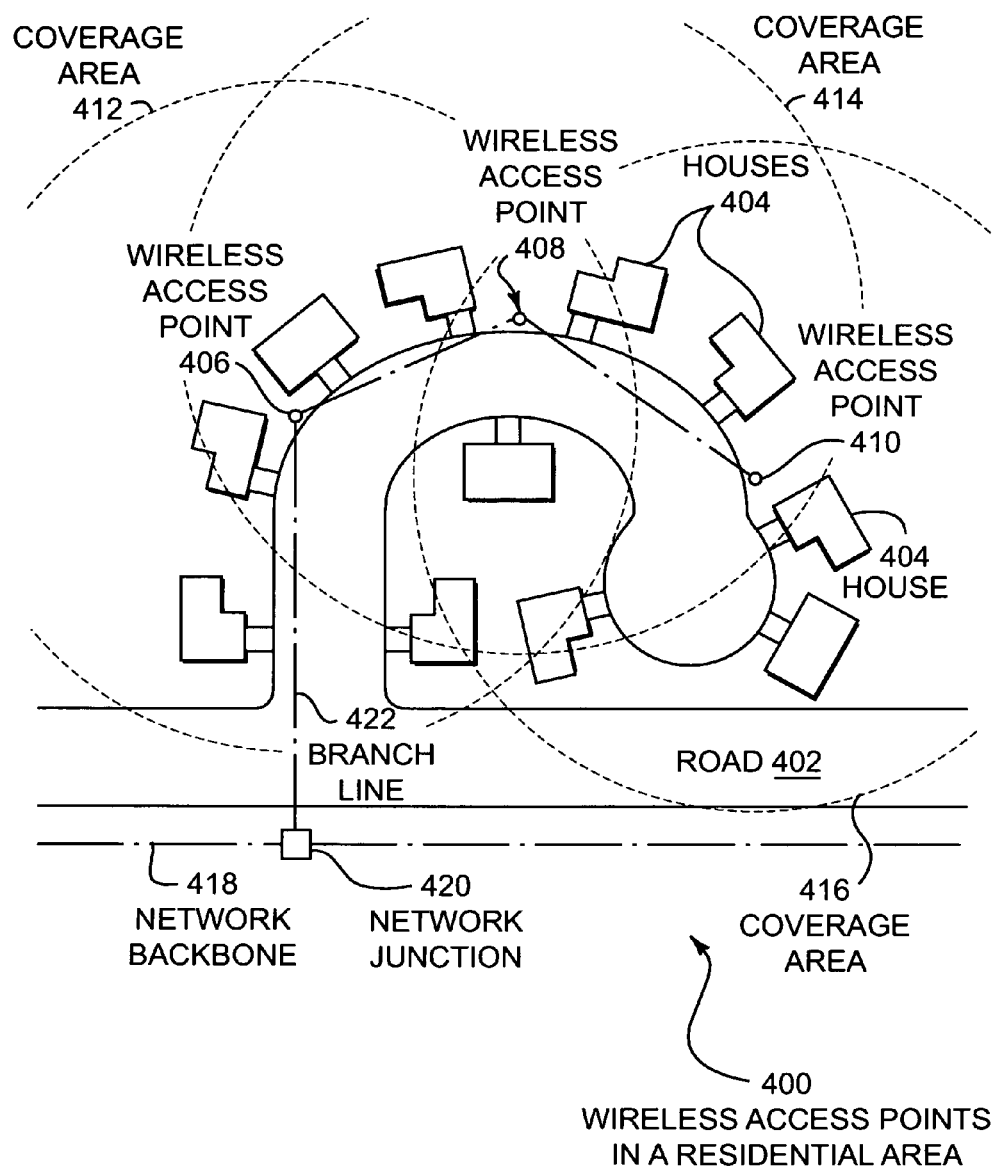
FIG. 4 is a plan view illustration of a residential neighborhood having wireless access service.

FIG. 4 illustrates a plan view of an embodiment 400 showing wireless access points deployed in a residential area. A road 402 is shown with several houses 404. Wireless access points 406, 408, and 410 are shown with their respective coverage areas 412, 414, and 416 that blanket the residential complex. The network backbone 418 runs along the main road 402 and has a junction 420 that connects the wireless access points 406, 408, and 410 along the branch line.

Embodiment 400 is an application for wireless connectivity in a residential area. The wireless access points 406, 408, and 410 may provide various communications to and from the homes 404, such as internet data connections, voice telephony, video services, and any other communication. In many applications, the wireless access points may use a standardized radio communications protocol, such as those defined by IEEE 802.11 specification. In other applications, different radio communications protocols, including custom or non-standard protocols, may be used.

The wireless access points 406, 408, and 410 may be mounted on utility poles for areas that have overhead utility lines. In areas with underground utilities, the wireless access points may be mounted on utility pedestals that are short stanchions connected to the underground cabling. The utility pedestals may also may be used for making various connections with the underground cabling.

The network backbone 418 may be a coaxial cable, fiber optic, twisted pair, or other communications cable. In some configurations, the network backbone 418 may be similar to a conventional cable television plant using DOCSIS or other communication protocols. In other configurations, the network backbone 418 may be twisted pair DSL lines that are connected using a DSLAM. In still other configurations, the network may be an Ethernet or Ethernet-type network.

The wireless access points 406, 408, and 410 may be configured such that the beacon signals from all of the wireless access points are broadcast substantially simultaneously. The coordination and synchronization of the beacon signal may be performed by various methods, including the method described in embodiment 300 and variations of such method.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A network comprising:
    a backbone;
    a plurality of radio terminals connected to said backbone, each of said plurality of radios being configured to establish at least one two-way data communication session, and configured to delay sending a transmission when another ongoing transmission is detected, at least two of said plurality of radio terminal being located remotely from each other;
    a controller connected to said backbone and configured to:
    transmit a signal along said backbone to each of said plurality of radio terminals to determine a transmission delay, said transmission delay comprising a time to transmit from said controller to said wireless access point along said network;
    determine a maximum transmission delay from said transmission delays;
    calculate a beacon delay for each of said plurality of wireless access points using said maximum transmission delay and said transmission delays;
    transmit said beacon delay to each of said radio terminals; and
    transmit a synchronization signal along said backbone to each of said plurality of radio terminals;
    wherein each of said plurality of radio terminals being configured to transmit a beacon signal at the same time and on the same channel.

2. The network of claim 1 wherein each of said plurality of radio terminals has a backbone transmission delay that is calculated by transmitting a calibration message from said controller to each of said plurality of radios.

3. The network of claim 1 wherein said synchronization signal is repeatedly transmitted along said backbone at a predetermined interval.

4. The network of claim 1 wherein said controller comprises a connection to the Internet.

5. The network of claim 1 wherein at least one of said radio terminals comprises a directional antenna.

6. The network of claim 1 wherein a portion of a first coverage area of one of said plurality of radio terminals overlaps a portion of a second coverage area of a second of said plurality of radio terminals.

7. The network of claim 6 wherein each of said plurality of radio terminals is positioned so that each of said plurality of radio terminals can receive a radio transmission from at least one other of said plurality of radio terminals.

8. The network of claim 1 wherein at least one of said radio terminals are mounted on a utility pole.

9. The network of claim 1 wherein at least one of said radio terminals are mounted in a utility pedestal.

10. The network of claim 1 wherein said network further comprises an Internet connection.

11. The network of claim 1 wherein said backbone comprises at least one of a group composed of twisted pair cable, coaxial cable, fiber optic cable, hybrid fiber/coax, and a radio communication path.

12. The network of claim 1 wherein at least one of said plurality of radio terminals is configured to operate in substantial conformance with IEEE 802.11 specification.

13. The network of claim 1 wherein said beacon signal comprises an identifier for a radio transmitter.

14. The network of claim 1 wherein said beacon signal comprises a network identifier.

15. A method comprising:
    establishing communications between a controller and a plurality of wireless access points connected on a network;
    determining a transmission delay for each of said plurality of wireless access points connected on said network, said transmission delay comprising a time to transmit from said controller to said wireless access points along said network;
    determining a maximum transmission delay from said transmission delays;
    calculating a beacon delay for each of said plurality of wireless access points using said maximum transmission delay and said transmission delays;
    sending a synchronization signal from said controller to said plurality of wireless access points via said network; and
    transmitting a beacon signal from each of said plurality of wireless access points at the same time and on the same channel using said heartbeat and said beacon delay for each of said plurality of wireless access points.

16. The method of claim 15 wherein at least one of said wireless access points comprises at least two radio transceivers.

17. The method of claim 15 wherein said synchronization signal is repeatedly transmitted along said network at a predetermined interval.

18. The method of claim 15 wherein said controller comprises a connection to the Internet.

19. The method of claim 15 wherein at least one of said wireless access points comprises a directional antenna.

20. The method of claim 15 wherein a portion of a first coverage area of one of said plurality of wireless access points overlaps a portion of a second coverage area of a second of said plurality of wireless access points.

21. The method of claim 20 wherein each of said plurality of wireless access points is positioned so that each of said plurality of wireless access points can receive a radio transmission from at least one other of said plurality of wireless access points.

22. The method of claim 15 wherein at least one of said wireless access points are mounted on a utility pole.

23. The method of claim 15 wherein at least one of said wireless access points are mounted in a utility pedestal.

24. The method of claim 15 wherein said network further comprises an Internet connection.

25. The method of claim 15 wherein said network comprises at least one of a group composed of twisted pair cable, coaxial cable, fiber optic cable, hybrid fiber/coax, and a radio communication path.

26. The method of claim 15 wherein at least one of said plurality of wireless access points is adapted to operate in substantial conformance with IEEE 802.11 specification.

27. The method of claim 15 wherein said beacon signal comprises an identifier for a radio transmitter.

28. The method of claim 15 wherein said beacon signal comprises a network identifier.

* * * * *